US012448816B2

(12) United States Patent
Gartner

(10) Patent No.: US 12,448,816 B2
(45) Date of Patent: Oct. 21, 2025

(54) LOCK SYSTEM AND ELECTROMECHANICAL LOCK DEVICE

(71) Applicant: Q SECURITY, LLC, Nicholasville, KY (US)

(72) Inventor: Klaus W. Gartner, Palos Verdes Estates, CA (US)

(73) Assignee: Q SECURITY, LLC, Nicolasville, KY (US)

( * ) Notice: Subject to any disclaimer, the term of this patent is extended or adjusted under 35 U.S.C. 154(b) by 31 days.

(21) Appl. No.: 18/337,673

(22) Filed: Jun. 20, 2023

(65) Prior Publication Data

US 2024/0426135 A1 Dec. 26, 2024

(51) Int. Cl.
*E05B 47/00* (2006.01)
*E05B 47/06* (2006.01)
*E05B 65/00* (2006.01)

(52) U.S. Cl.
CPC ...... *E05B 47/0012* (2013.01); *E05B 47/0603* (2013.01); *E05B 65/0075* (2013.01); *E05B 2047/0024* (2013.01)

(58) Field of Classification Search
CPC ............. E05B 47/0603; E05B 65/0075; E05B 2047/0024; E05B 47/0669; E05B 47/0012
See application file for complete search history.

(56) References Cited

U.S. PATENT DOCUMENTS 5,749,252 A 5/1998 Rhoades
9,951,546 B1 4/2018 Maniaci
2008/0276672 A1* 11/2008 Gartner ............... E05B 63/0017 70/277
2008/0314100 A1 12/2008 Min
2016/0244995 A1 8/2016 Gartner
2018/0051486 A1 2/2018 Yuan
2021/0372164 A1 12/2021 Gartner
2022/0098901 A1 3/2022 Gartner

FOREIGN PATENT DOCUMENTS

WO 2014163630 A1 10/2014

OTHER PUBLICATIONS

Screen captures from YouTube video clip entitled "How Do PCBs Work?," 2 pages, uploaded on Aug. 19, 2016 by user "Techquickie". Retrieved from Internet: <https://www.youtube.com/watch?v=H9pGbLJknDk>. (Year: 2016).*

(Continued)

*Primary Examiner* — Christine M Mills
*Assistant Examiner* — Peter H Watson
(74) *Attorney, Agent, or Firm* — Rooney IP, LLC

(57) ABSTRACT

A lock system is configured to secure a container, and is mounted in a door between inner and outer walls. An electromechanical lock device is received in the door, where the electromechanical lock device includes a housing, a locking bolt arranged in the housing and movable between locked and unlocked positions, a motor operable to actuate a motor cam to move between blocked and unblocked positions, and a slider that engages the motor cam and the locking bolt, where the slider engages the motor cam in the blocked position and moves away from the locking bolt in the unblocked position so that the locking bolt is unlocked, allowing the door to open for accessing the inside of the secure container.

26 Claims, 6 Drawing Sheets

(56) References Cited

OTHER PUBLICATIONS

"Universal RotoBolt, UR40-20 Basic—Technical Manual," Lock Technology (2015), rev. 180922, pp. 1-2.
"RotoBolt, EM20-20 Basic—Technical Manual," Lock Technology (2015), rev. 181023, pp. 1-2.
European Patent Office, Extended Search Report in EP Application No. 23189084.9, Jan. 2, 2024.

* cited by examiner

LOCK SYSTEM AND ELECTROMECHANICAL LOCK DEVICE

FIELD

The present disclosure is directed to a lock system and an electromechanical lock device, more particularly, to the lock system incorporating the electromechanical lock device having a motor-driven cam for rotating a locking bolt between locked and unlocked positions.

BACKGROUND

Safes and other secure containers have traditionally used combination locks for controlling and authorizing entry. Early locks were entirely mechanical and relied on a person dialing a correct combination on a rotating dial. Rotation of the dial positioned mechanical elements within the lock such that dialing the correct combination allowed a locking bolt to release the container door. Proper dial rotation aligned gates in tumblers. Once the gates were aligned, a fence on a fence lever entered the aligned gates. Continued rotation of the dial and tumblers pulled the fence lever and withdrew the bolt.

However, over the years electromechanical locks have gradually replaced the mechanical locks described above. Indeed, electromechanical locks themselves have seen many improvements over the years. The use of sophisticated electronic logic circuitry has enabled the implementation of a series of complex and unique electronic combinations which has made improper entry into secured areas more difficult. When the lock is used to secure entry to a container, the electronic components are typically mounted within a housing inside the container door. The housing contains an actuating device and a circuit board. The electronic keypad transmits a signal to the circuit board, which contains the electronic circuitry that allows the lock to open and close. The keypad is located on the outside of the housing so as to be accessible to the user. A cable typically extends between the keypad and the circuit board for transmitting signals between the two components.

In addition to the electronic circuitry, electromechanical locks include a bolt. The bolt is movably constructed and is coupled to a bolt-displacing device enabling a user to selectively move the bolt into one of at least two end positions by means of the actuating device. The lock is "locked" in a first end position of the bolt and "open" or "unlocked" in a second end position of the bolt. When the user enters the correct combination into an electronic keypad, a signal is transmitted to the circuit board. The circuit board in turn actuates the actuating device, which allows the locking bolt to move to the unlocked position within the housing, thus allowing the user to open the safe door.

However, in existing electromechanical locks, the actuating device may have a complicated structure with mechanical components that are subject to wear with repeated use, and thus it would be desirable to provide a simpler, more reliable actuating device.

SUMMARY

A lock system includes an electromechanical lock device that is configured to secure a container, and is mounted in a door between inner and outer walls of the door. The electromechanical lock device includes a housing, a locking bolt arranged in the housing and movable between locked and unlocked positions, a motor operable to actuate a motor cam to move between blocked and unblocked positions, and a slider that engages the motor cam and the locking bolt, where the slider engages the motor cam in the blocked position and moves away from the locking bolt in the unblocked position so that the locking bolt is unlocked, allowing the door to open for accessing the inside of the secure container.

According to one aspect of the present disclosure, an electromechanical lock device may include: a housing including an opening; a locking bolt arranged in the housing and movable between a locked position in which the locking bolt is projected through the opening and an unlocked position in which the locking bolt is retracted in the housing; a motor mounted in the housing, the motor being operable to actuate a motor cam to move from a blocked position to an unblocked position; and a slider configured to engage the motor cam and the locking bolt in the blocked position of the motor cam, and move away from the locking bolt when the motor cam is actuated to the unblocked position, where the locking bolt is configured to move to the unlocked position when the slider moves away from the locking bolt.

The locking bolt may be a rotary locking bolt. The locking bolt may be configured to rotate relative to a pivot point connecting the locking bolt and the housing. The locking bolt may be formed in a crescent shape.

An outer surface of the locking bolt may include a serrated section formed on an outside of the locking bolt, the serrated section configured to engage with a serrated housing portion when the locking bolt is in the locked position.

The locking bolt may include a detent configured to engage with the slider in the locked position.

In the locked position, the locking bolt may be projected at least partially through the opening.

In the unlocked position, the locking bolt may be contained entirely within the housing.

The electromechanical lock device may further include a drive shaft operably connected to the motor, where the motor cam is rotatably mounted on the drive shaft. Upon actuation of the motor, the motor cam may be rotated on the drive shaft approximately 90 degrees from the blocked position to the unblocked position. Upon rotation of the motor cam, the slider may be configured to move in a transverse direction relative to a longitudinal axis of the drive shaft. Upon rotation of the motor cam, the slider may be configured to move in a transverse direction away from the locking bolt, and the locking bolt is configured to rotate to the unlocked position. The slider may include at least a first side, a second side, and a center section for receiving the motor cam. The first side may include at least an outer rim configured to stop the locking bolt in the blocked position of the motor cam. The first side may include at least an inner rim configured to engage the motor cam in the blocked position of the motor cam. The second side may be configured to contact the housing when the motor cam is moved to the unblocked position of the motor cam.

According to another aspect of the present disclosure, a lock system may include: a door configured to secure a container, the door including an inner wall and an outer wall defining a wall volume between the inner wall and the outer wall; and an electromechanical lock device mounted to the door, the electromechanical lock device including: a housing including an opening; a locking bolt arranged in the housing and movable between a locked position in which the locking bolt is projected through the opening and an unlocked position in which the locking bolt is retracted in the housing; a motor mounted in the housing, the motor being operable to actuate a motor cam to move from a blocked position to an unblocked position; and a slider configured to engage the motor cam and the locking bolt in the blocked position of the motor cam, and move away from the locking bolt when the motor cam is actuated to the unblocked position, where the locking bolt is configured to move to the unlocked position when the slider moves away from the locking bolt.

The locking bolt may be a rotary locking bolt.

The lock system may include an electronic circuit board for controlling the motor. Upon entry of an authorized code, a signal may be transmitted to the electronic circuit board for actuating the motor. The electronic circuit board may be configured to transmit an electronic signal to the motor to actuate the motor.

The electromechanical lock device may be mounted on the inner wall of the door. The lock system may include a dial mounted on the outer wall of the door. The lock system may include a handle assembly mounted on the door, the handle assembly including a handle configured to be accessed on the outer wall of the door. The handle assembly may include a lock engagement device arranged on the inner wall of the door, the lock engagement device configured to engage the locking bolt in the locked position.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, where like numerals denote like elements.

DETAILED DESCRIPTION

Figure 1:
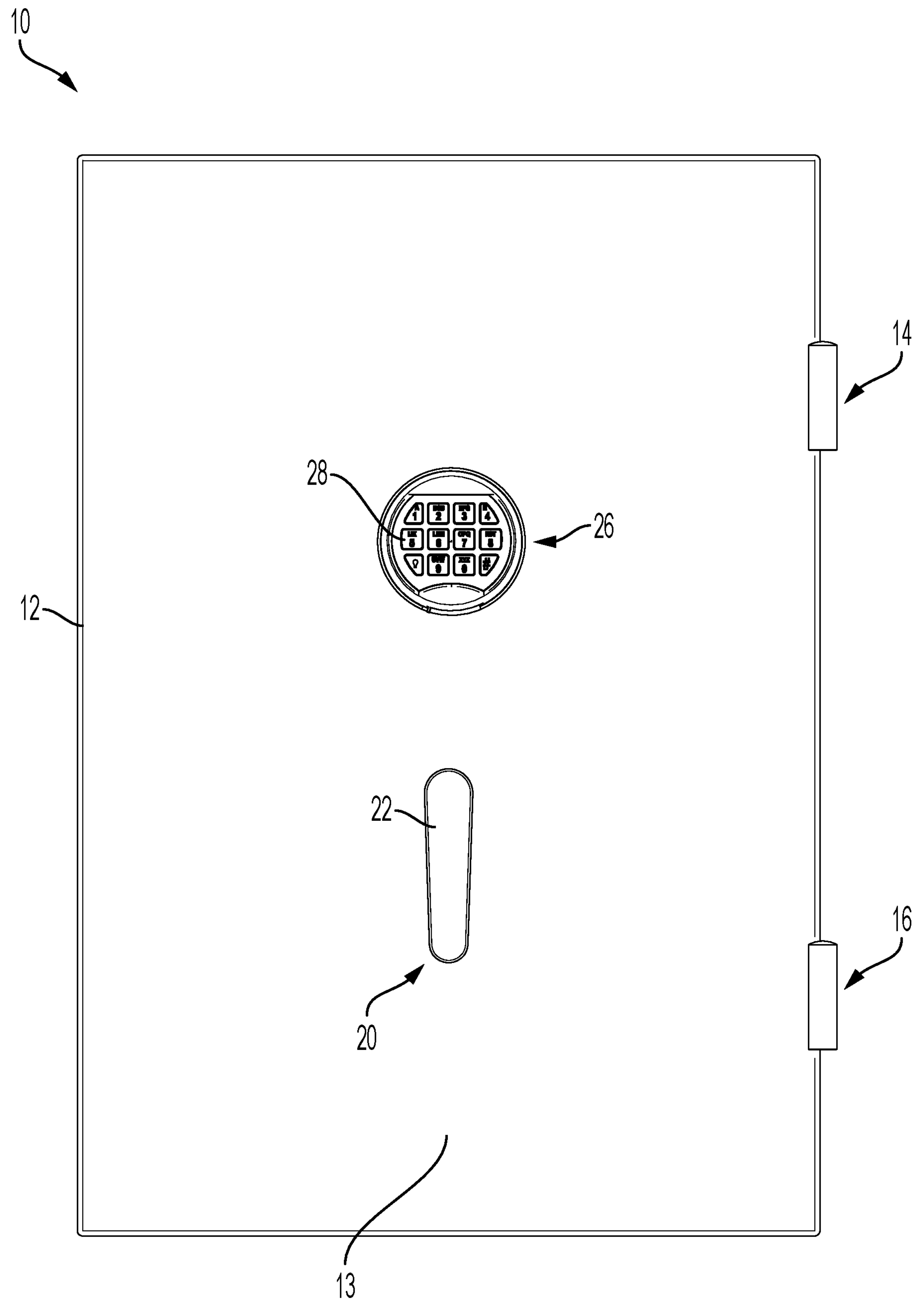
FIG. 1 is a front view of a door of a container having a keypad mounted to the door of the container to be secured.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant disclosure, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

Various examples of the disclosed technology are provided throughout this disclosure. The use of these examples is illustrative only, and in no way limits the scope and meaning of the disclosure or of any exemplified form. Likewise, the disclosure is not limited to any particular preferred embodiments described herein. Indeed, modifications and variations of the disclosure may be apparent to those skilled in the art upon reading this specification, and can be made without departing from its spirit and scope. The disclosure is therefore to be limited only by the terms of the claims, along with the full scope of equivalents to which the claims are entitled.

Certain relationships between features of the suppressor are described herein using the term "substantially" or "substantially equal." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" indicates that the orthogonal relationship is not a strict relationship and does not exclude functionally similar variations therefrom.

A safe or other secure container is referred to herein as a "container," and may include a handle assembly for opening the container and a bolt locking device for securing the container. The bolt locking device includes a locking bolt configured to move between locked and unlocked positions (sometimes referred to as blocking and non-blocking positions, respectively). As provided herein, a bolt of a bolt locking device is referred to as a "locking bolt" and is described as movable between a "locked position" (blocking position) and an "unlocked position" (non-blocking position). When the locking bolt is in the locked position, it engages with corresponding boltwork mounted in the door of the container, such that when the locking bolt is moved to the unlocked position, the handle assembly can be manually actuated, allowing a user to open the door and access the container.

The handle assembly may include a handle on an outside of the door of the container and a lock engagement device (i.e., boltwork) mounted to an inside of the door. Alternatively, the lock engagement device can be a separate component that is operably connected to the handle assembly, and thus enables the user to access contents of the container, e.g., when the user enters the correct code via keypad entry, and thus causes the locking bolt of the bolt locking device to move to the unlocked position.

Figure 2:
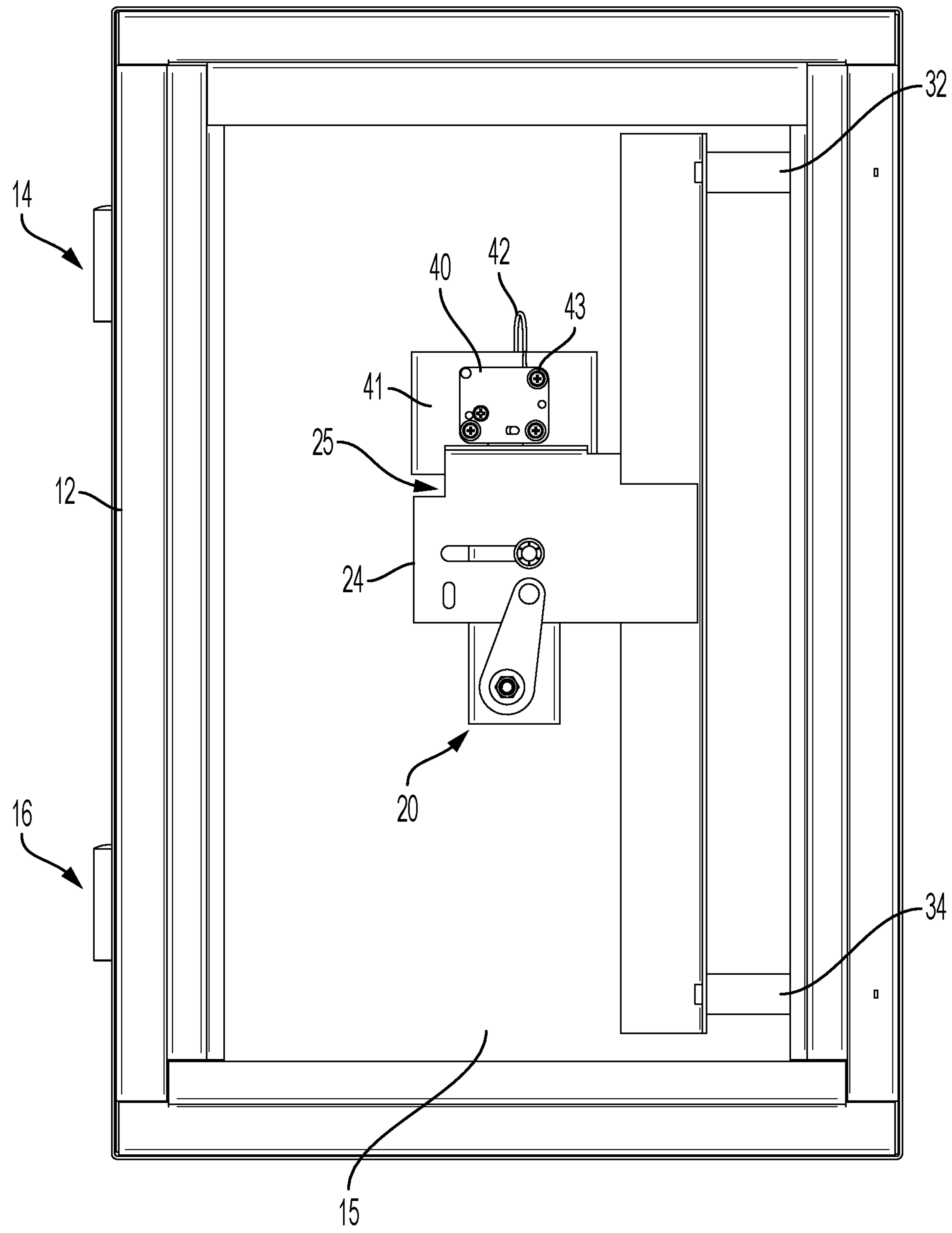
FIG. 2 is a rear view of the door of the container of FIG. 1 showing an electromechanical lock device mounted on the door in which a locking bolt of the electromechanical lock device is in an unlocked position.
Figure 3:
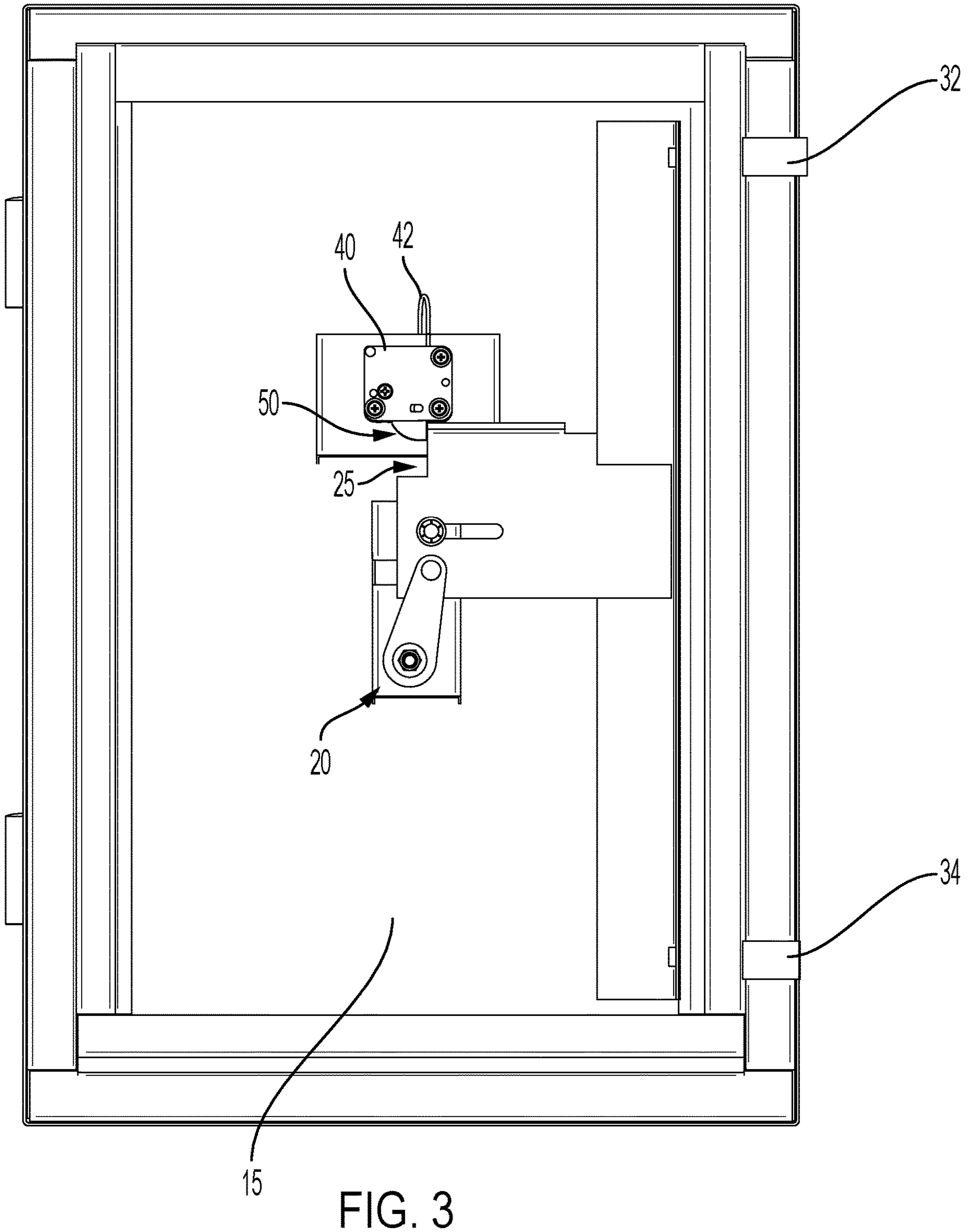
FIG. 3 is a rear view of the door of the container of FIG. 1 in which the locking bolt of the electromechanical lock device is in a locked position.

FIGS. 1-3 depict views of a lock system 10 according to the present disclosure in which an electromechanical lock device 40 is mounted on an inside of a door 12 that controls access to a container, and an outside of the door 12 includes a keypad entry. The door 12 may be connected to the container by a pair of hinges 14, 16.

The door 12 of the container preferably includes an outer wall 13 and an inner wall 15 as shown in FIGS. 1 and 2, respectively, where the outer wall 13 is located on the outside of the door 12, and is manually accessible by a user for opening the container. The inner wall 15 is located on the inside of the door 12, and includes the electromechanical lock device 40 for securing the container. The electromechanical lock device 40 may be mounted to the inner wall 15 of the door 12 via a mounting plate 41. For example, the electromechanical lock device 40 may be mounted to the mounting plate 41 by one or more fasteners, such as screws, bolts, etc., or may be press fit or otherwise attached to the inner wall 15 in a conventional manner. As shown in FIG. 2, one or more screws 43 (e.g., three screws) may be used to permanently affix the electromechanical lock device 40 to the mounting plate 41 on the inner wall 15 of the door 12. In other embodiments, the mounting plate 41 may be modified or omitted.

Referring again to FIGS. 1 and 2, a handle assembly 20 is mounted in a cavity of the door 12, and includes a handle 22 that may be engaged by the user to open the door 12 when the container is unlocked. The handle assembly 20 preferably includes a lock engagement device 24 (or other type of boltwork) operably connected to the handle 22, such that when the user manually engages the handle 22 while the container is unlocked (i.e., a locking bolt 50 is in an unlocked position, as described herein), then the lock engagement device 24 is disengaged from the locking bolt 50, thereby allowing the door 12 to be freely opened or closed.

The lock system 10 according to the present disclosure includes a device for unlocking the electromechanical lock device 40, such as by keypad entry. As shown in FIG. 1, a dial 26 is mounted on the outer wall 13 of the door 12, and includes an electronic keypad 28. Use of electronic keypads to control entry to safes and other secure containers is well known. The electronic keypad 28 may include numbers 0-9, which when contacted by the user entering an authorized combination, will generate an electronic signal that is transmitted through a cable 42 to an electronic circuit board 46 of the electromechanical lock device 40. The authorized combination may be, e.g., a six-digit code, although the electronic keypad 28 may be programmed in a known manner to include authorized combinations of a four-digit code, a five-digit code, or any other suitable length of code. Entry of the correct code (authorized combination) results in transmission of the electronic signal through the cable 42 to the electronic circuit board 46, which causes actuation of a motor 60 included in the electromechanical lock device 40, as described herein. Once the electromechanical lock device 40 is unlocked, i.e., when the locking bolt 50 is moved to a non-blocking position, then the user can manually turn the handle 22 to open the door 12 and enable access to the container.

FIGS. 2 and 3 depict an exemplary installation of the electromechanical lock device 40 on the door 12 of a container for controlling access to an inside of the container. In particular, the electromechanical lock device 40 preferably is mounted in the cavity defined by the inner wall 15 of the door 12. The electromechanical lock device 40 is configured to interact with boltworks, which in this case corresponds to the lock engagement device 24. The lock engagement device 24 may be part of the handle assembly 20 or provided as a separate component. The lock engagement device 24 may include an engagement rim 25 or similar structure for engaging the locking bolt 50 of the electromechanical lock device 40.

FIG. 2 depicts a locking bolt 50 of the electromechanical lock device 40 in an unlocked position, and FIG. 3 depicts the locking bolt 50 in the locked position. Preferably the electromechanical lock device 40 is mounted to provide a minimum clearance of about 1 mm to 2 mm between a base (bottom) of the electromechanical lock device 40 and a top of the engagement rim 25. In particular, the lock engagement device 24 is configured to move relative to the electromechanical lock device 40, in order to facilitate opening or closing of the door 12. In the unlocked state of FIG. 2, the lock engagement device 24 is able to move freely with respect to the electromechanical lock device 40, where the locking bolt 50 is retracted into the electromechanical lock device 40. In the locked state of FIG. 3, the lock engagement device 24 is restrained from movement at least because the locking bolt 50 protrudes, and thus blocks movement of the lock engagement device 24, in the locked position of the locking bolt 50.

Referring again to FIG. 2, in the unlocked state, the engagement rim 25 of the lock engagement device 24 is disengaged from the locking bolt 50, thus allowing the lock engagement device 24 to move laterally. In such a state, if the handle 22 is manipulated by the user, the door 12 may be opened. The lock engagement device 24 may include one or more door bolts 32, 34 that are configured to pass through respective door openings of the door 12 when the locking bolt 50 is in the locked position. When the locking bolt 50 is in the unlocked position as depicted in FIG. 2, the lock engagement device 24 is able to move freely, such that the door bolts 32, 34 are withdrawn from their respective door openings, thus allowing the door 12 to open.

In the locked state of FIG. 3, the lock engagement device 24 is restrained from movement due to the presence of the locking bolt 50, which protrudes from a housing 44 into a path of movement of the lock engagement device 24. Thus, in the locked state, even if the handle 20 is operated, the door 12 is prevented from opening due to the presence of the locking bolt 50. Upon entry of the authorized combination via the electronic keypad 28, the locking bolt 50 is configured to move from the locked position to the unlocked position, thus enabling the user to manipulate the handle 20 to open the door 12 and access the contents of the container.

Details of the electromechanical lock device 40 will be described with reference to FIGS. 4-6. The electromechanical lock device 40 is formed with the housing 44 that is configured to receive at least the locking bolt 50, a motor 60, a motor cam 70, and a slider 80. The housing 44 can be generally rectangular in shape with a width dimension 45 and a length dimension 47, where the width dimension 45 may be about 20 to 80 mm, more preferably about 40 to 60 mm, and the length dimension 47 may be about 40 to 100 mm, more preferably about 50 to 70 mm.

Figure 4:
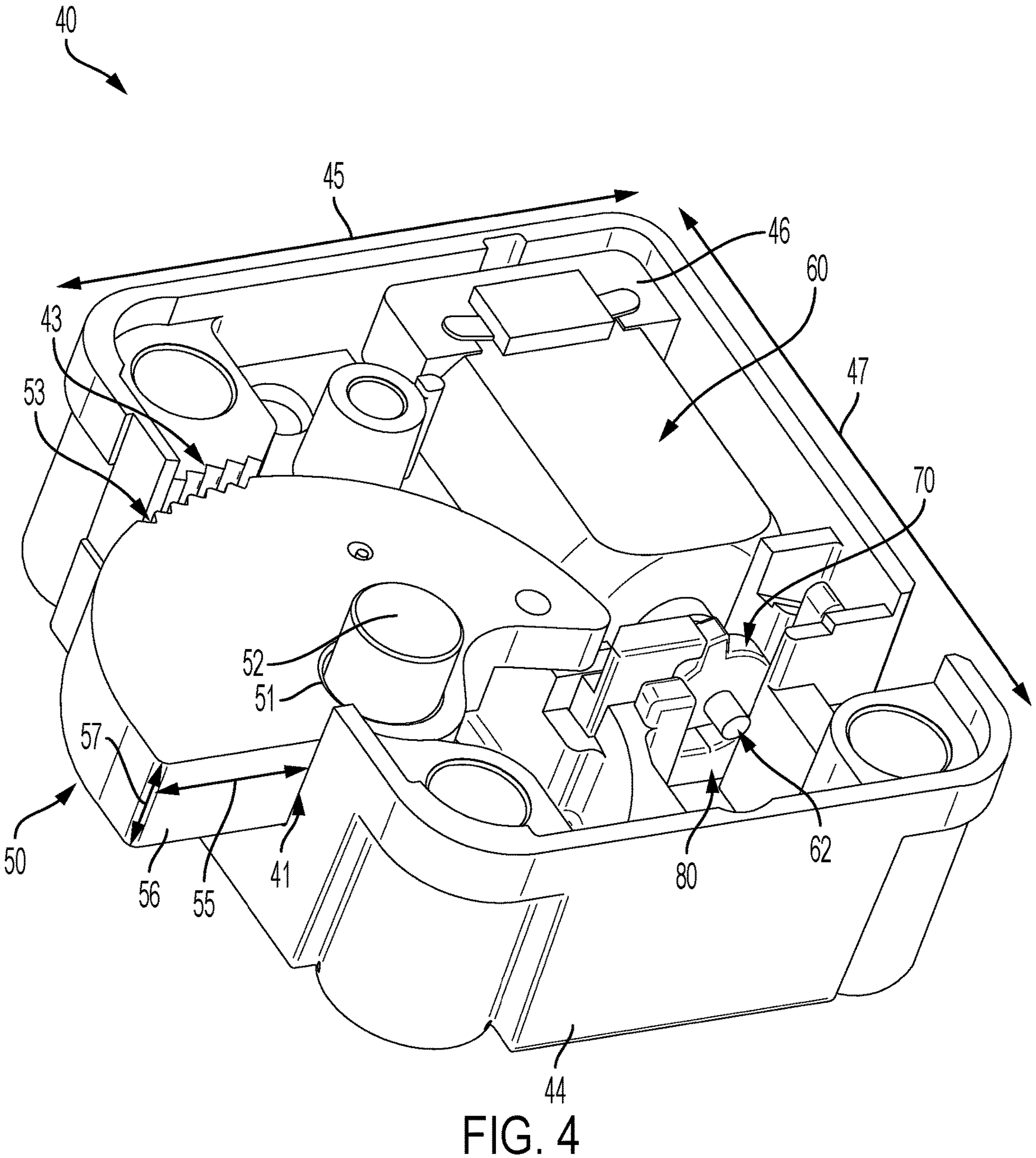
FIG. 4 is an internal view of an electromechanical lock device according to the present disclosure in which the locking bolt is in the locked position.

As shown in FIG. 4, the housing 44 defines an internal space for mounting components of the electromechanical lock device 40. The locking bolt 50 is mounted in the housing 44, and preferably is a rotary locking bolt that is configured to rotate relative to a pivot point, and project through an opening 41 of the housing 44. For example, as shown in FIG. 4, the locking bolt 50 may be formed in a crescent or half-moon shape, e.g., in the shape of a semi-circle, and may include a hole 51 to enable pivoting of the locking bolt 50. In FIG. 4, the hole 51 may be received on a peg 52 mounted to the housing 44, where the locking bolt 50 is configured to rotate relative to the peg 52. However, the locking bolt 50 may be rotatably mounted to the housing 44 by any suitable arrangement, or the locking bolt 50 can be replaced by a suitable non-rotary locking bolt.

In addition, the locking bolt 50 optionally may be formed with a serrated section 53 on at least a portion of an exterior of the locking bolt 50, where the serrated section 53 is configured to mesh with a corresponding serrated housing section 43 that may be formed as part of the housing 44, or alternatively, may be included as a separate component mounted within the housing 44. Interaction between the serrated section 53 and the serrated housing section 43 may help to maintain the electromechanical lock device 40 in a locked state when the locking bolt 50 is in the locked position.

Figure 5:
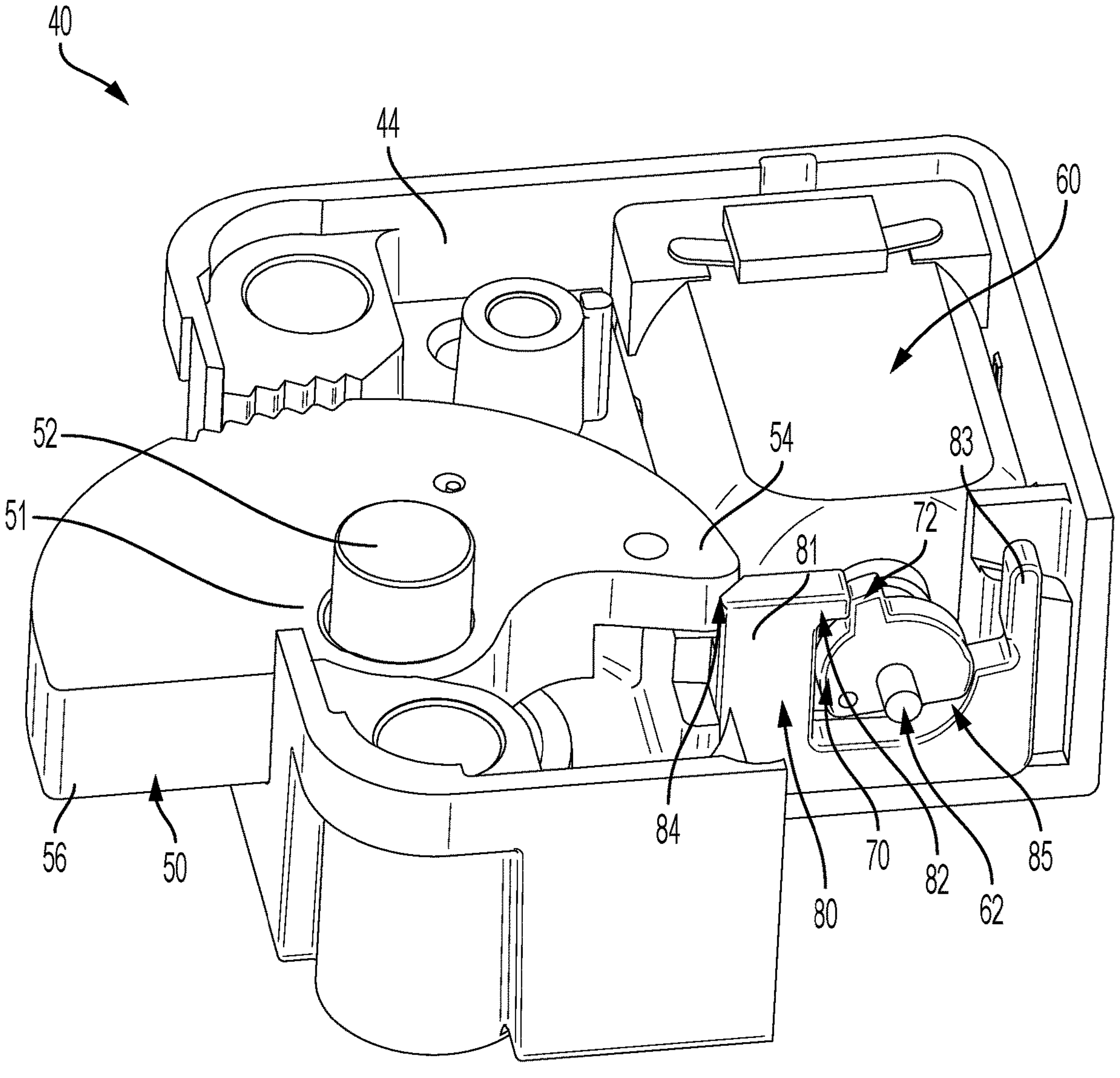
FIG. 5 is an enlarged perspective view of the electromechanical lock device of FIG. 4 in which a portion of a housing has been removed to show interaction between a motor cam and a slider when the locking bolt is in the locked position.

FIGS. 4 and 5 depict the electromechanical lock device 40 in the locked state, i.e., the locking bolt 50 is in the locked (blocking) position in which the locking bolt 50 protrudes at least partially through the opening 41 to outside of the housing 44. In the locked position, the locking bolt 50 may contact corresponding boltworks (e.g., the lock engagement device 24) outside of the housing 44, thus maintaining the door 12 in a closed/locked arrangement to prevent access to the inside of the container. The locking bolt 50 may protrude from the housing 44 for contacting the lock engagement device 24, such that a contact face 56 of the locking bolt 50 is configured to contact the engagement rim 25 of the lock engagement device 24, thus enabling the handle assembly 20 to exert pressure on the locking bolt 50. The contact face 56 of the locking bolt 50 may have a protruded length 55 of about 6 to 16 mm, more preferably about 8 to 14 mm, and a protruded width of about 4 to 10 mm, more preferably about 6 to 8 mm, or any other dimensions sufficient to withstand pressure from the handle assembly 20 when the locking bolt 50 is in the locked position.

Referring to FIG. 4, in addition to the locking bolt 50, the housing 44 contains the motor 60, which is operably connected to the electronic circuit board 46. The motor 60 is operably connected to a drive shaft 62, which is configured to actuate a motor cam 70. In particular, the motor cam 70 is rotatably mounted on the drive shaft 62. As described above, the electronic circuit board 46 is configured to receive a signal from the keypad entry as an input, and upon receiving the signal, is operable to actuate the motor 60.

As shown in greater detail in FIG. 5, in the locked state of the electromechanical lock device 40, the motor 60 is not operable, and thus the motor cam 70 is mounted on the drive shaft 62 in a non-rotating state. In such a state, a nose 72 of the motor cam 70 is configured to engage with the slider 80, and the motor cam 70 is in a blocked position.

The slider 80 includes at least a first side 81, a second side 83, and a center section 85 for receiving the motor cam 70. For example, the first and second sides 81, 83 includes structure that define the center section 85, which may be formed with a hollow portion for receiving the motor cam 70. The first side 81 may include an inner rim 82 protruding toward the center section 85, the inner rim 82 configured to engage with the nose 72 of the motor cam 70.

The slider 80 includes an outer rim 84 on an outside of the first side 81, where the outer rim 84 is configured to stop movement of a detent 54 of the locking bolt 50, and thus prevent rotation of the locking bolt 50 in the locked position. Whereas the locking bolt 50 is configured to rotate relative to the pivot point (e.g., via the peg 52 received in the hole 51), the slider 80 is configured to move in a transverse direction relative to a longitudinal axis of the drive shaft 62.

Figure 6:
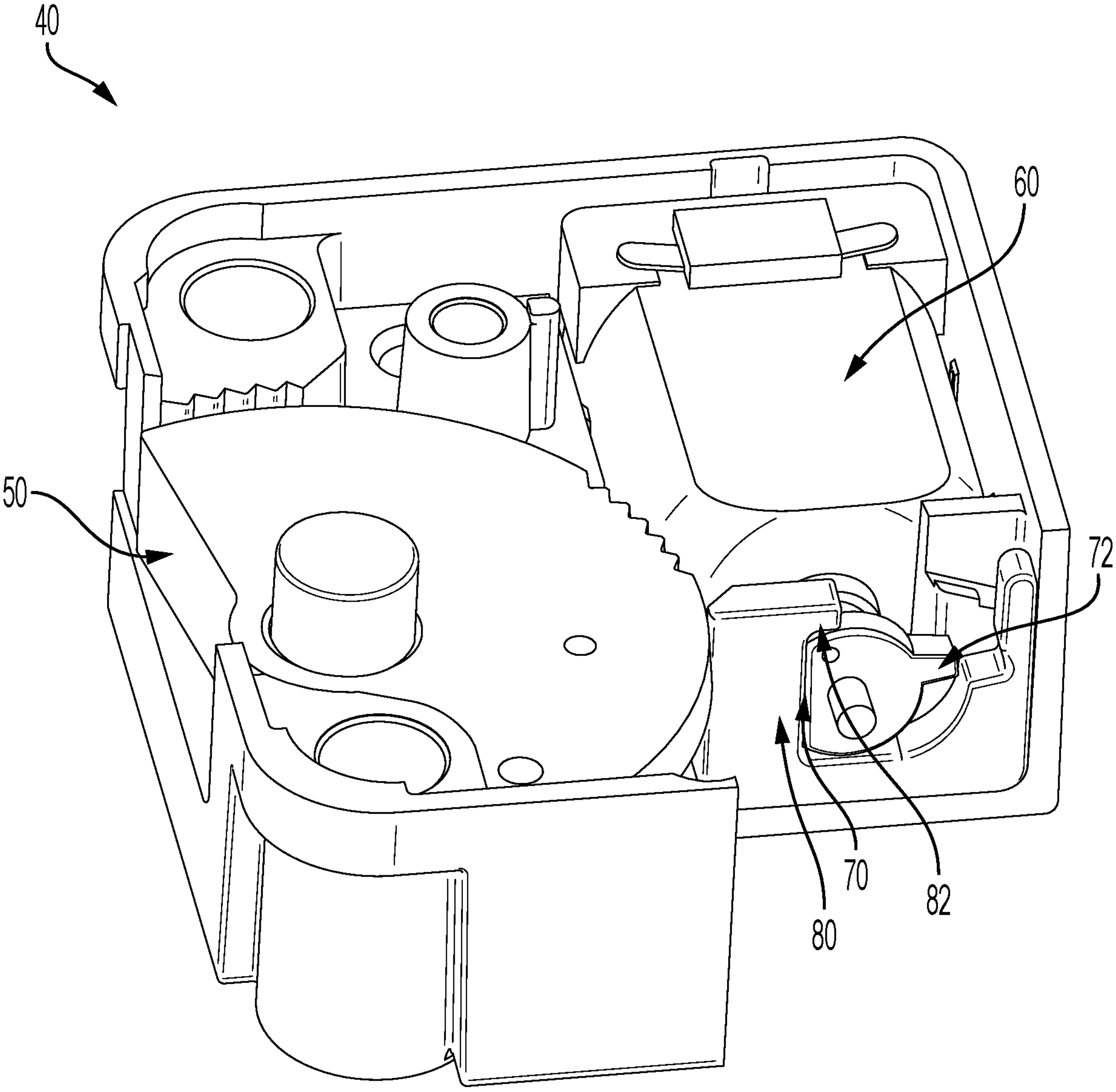
FIG. 6 is an enlarged perspective view of the electromechanical lock device of FIG. 4 in which the locking bolt is in an unlocked position.

Referring to FIGS. 5 and 6, when the electronic circuit board 46 receives the signal from the keypad entry, the motor 60 is actuated, which causes rotation of the drive shaft 62. Rotation of the drive shaft 62 results in movement of the motor cam 70 from the blocked position to an unblocked position. In particular, the motor cam 70 is rotated relative to the drive shaft 62 by approximately 90 degrees, and thus is brought out of engagement with the inner rim 82 of the slider 80, which corresponds to the unblocked position of the motor cam 70. As a result, the slider 80 is free to move in the transverse direction (e.g., from left to right in FIGS. 5-6). In particular, as shown in FIG. 6, the detent 54 of the locking bolt 50 has pushed against the slider 80, which has moved from left to right in the transverse direction, and in this state, the motor cam 70 has been rotated by approximately 90 degrees to the unblocked position, such that the nose 72 no longer engages the inner rim 82 of the slider 80. As a result, the locking bolt 50 may be retracted within the housing 44 of the electromechanical lock device 40, and thus the locking bolt 50 is in the unlocked position.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An electromechanical lock device comprising:

a housing including an opening;

a locking bolt arranged in the housing and movable between a locked position in which the locking bolt is projected through the opening and an unlocked position in which the locking bolt is retracted in the housing;

a motor mounted in the housing, the motor being operable to actuate a motor cam to move from a blocked position to an unblocked position; and a slider configured to engage the motor cam and the locking bolt in the blocked position of the motor cam preventing the locking bolt from moving from the locked position, and the slider is configured to be moved by the locking bolt when the motor cam is actuated to the unblocked position, wherein the locking bolt is configured to move to the unlocked position when the slider is moved by the locking bolt, wherein the motor cam moves the slider to engage the locking bolt when the locking bolt is in the locked position and the motor cam is actuated from the unblocked position to the blocked position.

2. The electromechanical lock device of claim 1, wherein the locking bolt is a rotary locking bolt.

3. The electromechanical lock device of claim 2, wherein the locking bolt is configured to rotate relative to a pivot point connecting the locking bolt and the housing.

4. The electromechanical lock device of claim 3, wherein the locking bolt is formed in a crescent shape.

5. The electromechanical lock device of claim 4, wherein an outer surface of the locking bolt includes a serrated section formed on an outside of the locking bolt, the serrated section configured to engage with a serrated housing portion when the locking bolt is in the locked position.

6. The electromechanical lock device of claim 2, wherein the locking bolt includes a detent configured to engage with the slider in the locked position.

7. The electromechanical lock device of claim 2, wherein in the locked position, the locking bolt is projected at least partially through the opening.

8. The electromechanical lock device of claim 2, wherein in the unlocked position, the locking bolt is contained entirely within the housing.

9. The electromechanical lock device of claim 1, further comprising a drive shaft operably connected to the motor, wherein the motor cam is rotatably mounted on the drive shaft.

10. The electromechanical lock device of claim 9, wherein upon actuation of the motor, the motor cam is rotated on the drive shaft approximately 90 degrees from the blocked position to the unblocked position.

11. The electromechanical lock device of claim 10, wherein upon rotation of the motor cam, the slider is configured to move in a transverse direction relative to a longitudinal axis of the drive shaft.

12. The electromechanical lock device of claim 10, wherein upon rotation of the motor cam, the slider is configured to move in a transverse direction away from the locking bolt, and the locking bolt is configured to rotate to the unlocked position.

13. The electromechanical lock device of claim 1, wherein the slider includes at least a first side, a second side, and a center section for receiving the motor cam.

14. The electromechanical lock device of claim 13, wherein the first side includes at least an outer rim configured to stop the locking bolt in the blocked position of the motor cam.

15. The electromechanical lock device of claim 13, wherein the first side includes at least an inner rim configured to engage the motor cam in the blocked position of the motor cam.

16. The electromechanical lock device of claim 13, wherein the second side is configured to contact the housing when the motor cam is moved to the unblocked position of the motor cam.

17. A lock system comprising:

a door configured to secure a container, the door including an inside and an outside; and an electromechanical lock device mounted to the door, the electromechanical lock device comprising:

a housing including an opening;

a locking bolt arranged in the housing and movable between a locked position in which the locking bolt is projected through the opening and an unlocked position in which the locking bolt is retracted in the housing;

a motor mounted in the housing, the motor being operable to actuate a motor cam to move from a blocked position to an unblocked position; and a slider configured to engage the motor cam and the locking bolt in the blocked position of the motor cam preventing the locking bolt from moving from the locked position, and the slider is configured to be moved by the locking bolt when the motor cam is actuated to the unblocked position, wherein the locking bolt is configured to move to the unlocked position when the slider is moved by the locking bolt, wherein the motor cam moves the slider to engage the locking bolt when the locking bolt is in the locked position and the motor cam is actuated from the unblocked position to the blocked position.

18. The lock system of claim 17, wherein the locking bolt is a rotary locking bolt.

19. The lock system of claim 17, further comprising an electronic keypad.

20. The lock system of claim 19, further comprising an electronic circuit board for controlling the motor.

21. The lock system of claim 20, wherein upon entry of an authorized code, a signal is transmitted to the electronic circuit board for actuating the motor.

22. The lock system of claim 20, wherein the electronic circuit board is configured to transmit an electronic signal to the motor to actuate the motor.

23. The lock system of claim 17, wherein the electromechanical lock device is mounted on the inside of the door.

24. The lock system of claim 23, further comprising an electronic keypad mounted on the outside of the door.

25. The lock system of claim 23, further comprising a handle assembly mounted on the door, the handle assembly including a handle configured to be accessed on the outside of the door.

26. The lock system of claim 25, wherein the handle assembly includes a lock engagement device arranged on the inside of the door, the lock engagement device configured to engage the locking bolt in the locked position.

* * * * *